United States Patent
Di Dio et al.

(10) Patent No.: US 11,539,396 B1
(45) Date of Patent: Dec. 27, 2022

(54) INTERFACE DEVICES FOR COMMUNICATIVELY COUPLING DIFFERENT COMMUNICATION MEDIUMS, AND ASSOCIATED METHODS

(71) Applicant: CABLE TELEVISION LABORATORIES, INC., Louisville, CO (US)

(72) Inventors: Mario Di Dio, Longmont, CO (US); Stephen Glennon, Lafayette, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 83 days.

(21) Appl. No.: 17/085,949

(22) Filed: Oct. 30, 2020

Related U.S. Application Data

(60) Provisional application No. 62/929,413, filed on Nov. 1, 2019.

(51) Int. Cl.
| | | |
|---|---|---|
| H04L 12/66 | (2006.01) |
| H04B 3/52 | (2006.01) |
| H04B 10/2575 | (2013.01) |
| H04B 3/54 | (2006.01) |

(52) U.S. Cl.
CPC .......... H04B 3/52 (2013.01); H04B 3/54 (2013.01); H04B 10/25753 (2013.01)

(58) Field of Classification Search
CPC ...... H04B 1/0071; H04B 1/0075; H04B 3/36; H04B 3/38; H04B 3/52; H04B 3/54; H04B 3/58; H04B 7/15507; H04B 10/2575; H04B 10/25753; H04B 10/29; H04B 10/298; H04L 5/14; H04L 25/20; H04L 25/22; H04L 25/40; H04W 84/047; H04W 88/04
See application file for complete search history.

(56) References Cited

U.S. PATENT DOCUMENTS

| | | | |
|---|---|---|---|
| 9,247,274 B2 * | 1/2016 | Ramesh | H04N 21/4383 |
| 2009/0290659 A1 * | 11/2009 | Petrovic | H04N 7/20 375/340 |
| 2010/0317387 A1 * | 12/2010 | O'Keeffe | H04N 7/17309 455/507 |
| 2017/0215192 A1 * | 7/2017 | Lipowski | H01Q 19/062 |
| 2017/0215210 A1 * | 7/2017 | Lipowski | H04L 41/12 |
| 2018/0262363 A1 * | 9/2018 | Chamberlain | H04B 3/36 |

* cited by examiner

Primary Examiner — Frank Duong
(74) Attorney, Agent, or Firm — PdZ Patent Law, PLLC

(57) ABSTRACT

An interface device for communicatively coupling a first communication medium and a second communication medium includes a radio frequency (RF) processor and a frequency shifting subsystem. The RF processor is configured to receive a first data signal from the first communication medium and convert the first data signal to a plurality of first internal RF signals having a common center frequency. The frequency shifting subsystem is configured to shift the plurality of first internal RF signals having the common center frequency to respective first external RF signals having different respective center frequencies, for transmission on the second communication medium. The second communication medium may be a coaxial electrical cable.

22 Claims, 8 Drawing Sheets

INTERFACE DEVICES FOR COMMUNICATIVELY COUPLING DIFFERENT COMMUNICATION MEDIUMS, AND ASSOCIATED METHODS

RELATED APPLICATIONS

This application claims benefit of priority to U.S. Provisional Patent Application Ser. No. 62/929,413, filed on Nov. 1, 2019, which is incorporated herein by reference.

BACKGROUND

Modern access communication networks, which provide Internet access and other services to end users such as residences and businesses, are frequently capable of high-bandwidth data transmission. For example, cable access communication networks are frequently capable of transmitting downlink data to end users at a bandwidth of up to 1 gigabit per second (GBs). Additionally, passive optical access communication networks often can transmit uplink and downlink data at bandwidths of 1 GB s or greater. Furthermore, the next generation of cable access communication networks will support bandwidths of up 10 GB s, thereby enabling a whole new class of applications that are not feasible today.

However, many end users are unable to distribute high-bandwidth data throughout their premises. While some newer buildings have network cabling, such as Category 5e or Category 6 Ethernet cabling, for distributing high-bandwidth data signals to various rooms in the building, most buildings lack such network cabling, especially buildings that are more than 10 to 20 years old. Consequently, many end users rely on wireless data transmission to transmit data signals in a building between a modem or gateway and client devices.

Wireless data transmission in buildings is typically accomplished using wireless access points and wireless clients, where the wireless clients are sometimes referred to as "stations," operating according to an Institute of Electrical and Electronics Engineers (IEEE) 802.11-based protocol, frequently referred to as a "Wi-Fi" protocol. Modern Wi-Fi protocols, such as the 802.11ax protocol operating in the 5 GHz range, and the 802.11ad protocol operating in the 60 GHz range, are capable of achieving high throughput under favorable operating conditions. However, Wi-Fi wireless signals may suffer from propagation loss and interference from neighboring wireless access points, in real-world applications. For example, walls in a building may attenuate, or completely block, Wi-Fi wireless signals traveling between a wireless access point and a wireless client, thereby interfering with communication. This problem is particularly acute with the Wi-Fi 802.11ad protocol, due to its high operating frequencies. Consequently, Wi-Fi wireless communication systems are frequently incapable of providing high-bandwidth data transmission to wireless clients that are distant from a host wireless access point, such as wireless clients that are in a different room than the wireless access point. Accordingly, many end users lack capability to experience the full potential of a high-bandwidth access communication network, due to data distribution constraints within their premises.

DETAILED DESCRIPTION OF THE EMBODIMENTS

While buildings frequently lack network cable, many buildings include coaxial electrical cable, such as for distributing television signals within the building. Indeed, it is common for every major room in a building to have a coaxial cable outlet. Additionally, coaxial electrical cable commonly found in buildings is inherently capable of carrying high-bandwidth data due to its low attenuation of signals of up to around 1.5 gigahertz (GHz). Consequently, coaxial electrical cable is an attractive alternative to Wi-Fi wireless communication for transmitting high-bandwidth data within a building.

However, conventional approaches to transmitting data on a coaxial electrical cable have significant drawbacks. For example, data is conventionally transmitted via a coaxial electrical cable in a building via point-to-point communication, which does not readily scale to support multiple clients. Additionally, coaxial electrical cable splitters, which are commonly used for splitting a signal for distribution to multiple endpoints, can interfere with conventional coaxial electrical cable data transmission techniques. Furthermore, conventional devices for use with coaxial electrical cable data transmission may require propriety and/or costly components and technology.

Disclosed herein are interface devices and methods for communicatively coupling different communication mediums, which may at least partially overcome the above-discussed drawbacks of conventional data transmission in a user's premises. The new interface devices and methods are advantageously capable of receiving a high-bandwidth data signal, such as from a modem or gateway, and converting it to a form that is conducive for transmission on coaxial electrical cable that is commonly present in buildings. The new interface devices and methods are also capable of converting a signal received from a coaxial electrical cable to a form that may be used for transmission to a client device. Additionally, the new interface devices and methods do not rely on point-to-point communication but instead broadcast data, as represented by radio frequency (RF) signals, on coaxial electrical cable, so that the new interface devices enable point-to-multipoint communication. Therefore, the new interface devices and methods readily scale to support multiple clients, and the new interface devices and methods are tolerant of coaxial electrical cable splitters. Moreover, certain embodiments of the new interface devices may be constructed from commodity components, thereby promoting low-cost and ease of component procurement.

Figure 1:
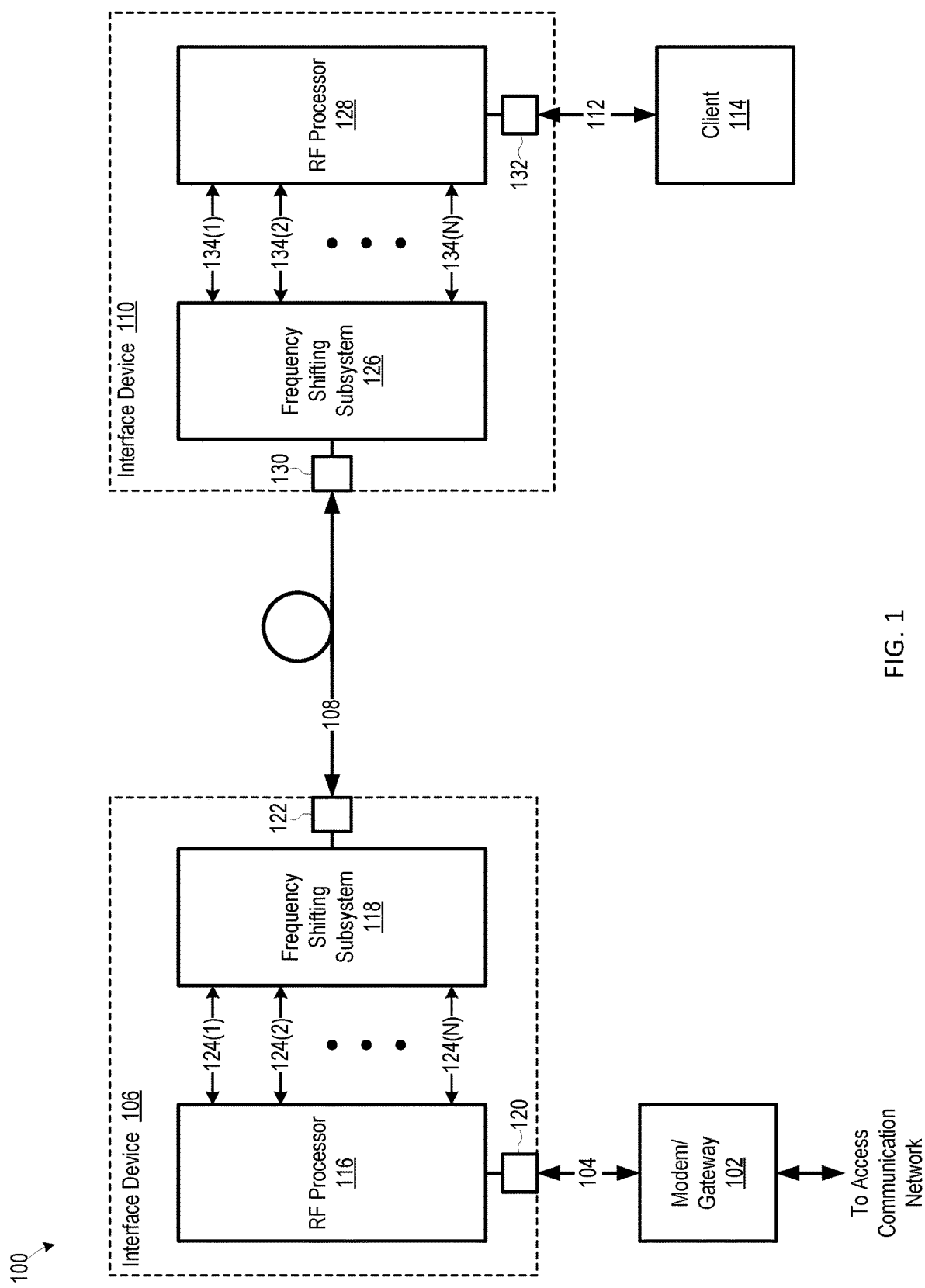
FIG. 1 is a schematic diagram of a communication system including interface devices for communicatively coupling different communication mediums, according to an embodiment.

FIG. 1 is a schematic diagram of a communication system 100 including embodiments of the new interface devices. Communication system 100 includes a modem or gateway 102, a first communication medium 104, an interface device 106, a second communication medium 108, an interface device 110, a third communication medium 112, and a client 114. As discussed below, each of interface devices 106 and 110 is an embodiment of the new interface devices for communicatively coupling different communication mediums.

First communication medium 104 is configured to communicatively couple modem or gateway 102, henceforth referred to as "modem 102" for brevity, with interface device 106. In some embodiments, first communication medium 104 is an electrical cable (e.g., an Ethernet electrical cable or a Universal Serial Bus (USB) electrical cable), an optical cable, or a wireless transceiver pair. Second communication medium 108 communicatively couples interface devices 106 and 110. In some embodiments, second communication medium 108 includes one or more coaxial electrical cables and associated devices, such as a splitter and/or a power inserter. However, second communication medium 108 is not limited to being a coaxial electrical cable. Third communication medium 112 communicatively couples interface device 110 and client 114. In certain embodiments, third communication medium 112 is an electrical cable (e.g., an Ethernet electrical cable or a USB electrical cable), an optical cable, or a wireless transceiver pair. Interface device 110 may be referred to as a "client interface device" due to it being communicatively coupled to client 114.

Modem 102 interfaces communication system 100 with an access communication network (not shown) by converting signals on the access communication network to data signals on first communication medium 104, and vice versa. In some embodiments, modem 102 includes (1) a cable modem (CM), e.g. operating according to a cable service interface specification (DOCSIS) protocol, (2) a digital subscriber line (DSL) modem, (3) an optical network terminal (ONT) or an optical network unit (ONU), e.g. operating according to an Ethernet passive optical network (EPON) protocol, a radio frequency over glass (RFOG) protocol, or a gigabit passive optical network (GPON) protocol, (4) a wireless modem, e.g. operating according to satellite communication protocol, a Wi-Fi protocol, a fixed wireless communication protocol, a cellular wireless communication protocol, such as a long term evolution protocol (LTE), a fifth generation (5G) protocol, a sixth generation (6G) protocol, and/or (5) any variations, improvements, and/or evolutions of the foregoing.

Interface device 106 is configured to communicatively couple first communication medium 104 and second communication medium 108, where the two communication mediums are of different types. Interface device 106 includes a radio frequency (RF) processor 116, a frequency shifting subsystem 118, a port 120, and a port 122. Port 120 is configured to communicatively couple data signals between first communication medium 104 and RF processor 116. In embodiments where first communication medium 104 is an Ethernet electrical cable, port 120 is an Ethernet electrical cable port. In embodiments where first communication medium 104 is a USB electrical cable, port 120 is a USB electrical cable port. In embodiments where first communication medium 104 is an optical cable, port 120 is an optical cable port.

RF processor 116 is configured to convert data signals from first communication medium 104 to N internal RF signals having a common center frequency, where N is an integer greater than one. In some embodiments, RF processor 116 is configured to generate the N internal RF signals such that the internal RF signals at least partially comply with an Institute of Electrical and Electronics Engineers (IEEE) 802.11-based standard, including but not limited to, an IEEE 802.11ax-based standard, an IEEE 802.11ad-based standard, an IEEE 802.11ay-based standard, or variations, improvements, and/or evolutions thereof. Accordingly, in some embodiments, RF processor 116 is an IEEE 802.11-based integrated circuit or "chip." RF processor 116 is communicatively coupled to frequency shifting subsystem 118 via N channels 124, that is, there is one channel 124 corresponding to each internal RF signal generated by RF processor 116. In this document, specific instances of an item may be referred to by use of a numeral in parentheses (e.g. channel 124(1)) while numerals without parentheses refer to any such item (e.g. channels 124).

The common center frequency of the N internal RF signals generated by RF processor 116 necessitates use spatial multiplexing when simultaneously transmitting the internal RF signals to a different point. However, spatial multiplexing is not feasible when using second communication medium 108 to transport RF signals. Therefore, frequency shifting subsystem 118 is configured to shift the N internal RF signals having a common center frequency, as received from RF processor 116, to N external RF signals having different respective center frequencies, for transmission on second communication medium 108. Spatial multiplexing is not required for transmitting signals at different center frequencies, and frequency shifting subsystem 118 accordingly converts the internal RF signals from RF processor 116 to a form that can be transmitted by second communication medium 108. In some embodiments, frequency shifting subsystem 118 is configured to stack the external RF signals in RF spectrum so that all external RF signals are within a frequency range that is compatible with second communication medium 108. For example, in embodiments where second communication medium 108 is a coaxial electrical cable, such as a RG59 or a RG6 coaxial cable, that is suitable for carrying signals with a frequency up to around 1.5 gigahertz (GHz), frequency shifting subsystem 118 is configured to stack the external RF signals so that each of the second RF signals has a center frequency of less than 1.5 GHz.

Port 122 is configured to communicatively couple RF signals, e.g. the external RF signals generated by frequency shifting subsystem 118, between frequency shifting subsystem 118 and second communication medium 108. In embodiments where second communication medium 108 is a coaxial electrical cable, port 122 is a coaxial electrical cable port. Second communication medium 108 is configured to communicatively couple RF signals, e.g. the external RF signals generated by frequency shifting subsystem 108, between interface devices 106 and 110. Accordingly, interface device 106 broadcasts the external RF signals onto second communication medium 108 for reception by client interface devices, e.g. interface device 110.

Interface device 110 is configured to communicatively couple second communication medium 108 and third communication medium 112, where the two communication mediums are of different types. Interface device 110 includes a frequency shifting subsystem 126, a RF processor 128, a port 130, and a port 132. Port 130 is configured to communicatively couple RF signals, e.g. the external RF signals generated by frequency shifting subsystem 118, between second communication medium 108 and frequency shifting subsystem 126. In embodiments where second communication medium 108 is a coaxial electrical cable, port 130 is a coaxial electrical cable port.

Frequency shifting subsystem 126 is configured to shift the external RF signals from second communication medium 108 and having different respective center frequencies to N internal RF signals having a common center frequency. The N internal RF signals are communicatively coupled from frequency shifting subsystem 126 to RF processor 128 via N channels 134. In some embodiments, the common center frequency of the N internal RF signals of interface device 110 is the same as the common center frequency of the N internal RF signals of interface device 106, although this is not required. RF processor 128 is configured to convert the N internal RF signals to a data signal for transmission on third communication medium 112. In some embodiments, RF processor 128 is an IEEE 802.11-based integrated circuit or chip. Additionally, in some embodiments, RF processor 116 of interface device 106 and RF processor 128 of interface device 110 collectively form an IEEE 802.11-based chipset.

Port 132 is configured to communicatively couple data signals between RF processor 128 and third communication medium 112. In embodiments where third communication medium 112 is an Ethernet electrical cable, port 132 is an Ethernet electrical cable port. In embodiments where third communication medium 112 is a USB electrical cable, port 132 is a USB electrical cable port. In embodiments where third communication medium 112 is an optical cable, port 132 is an optical cable port. Examples of client 114 include, but are not limited to, a mobile telephone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an IAB access point, a microcell, a picocell, a femtocell, a macrocell, a Wi-Fi-based application, a satellite communication device, etc.).

Interface device 110 in configured to convert all N instances of the external RF signals received from second communication medium 108 to a form compatible with third communication medium 112. However, some alternate embodiments of interface device 110 are configured to convert only a subset of the N external RF signals to a form compatible with third communication medium 112, such as in applications where client 114 does not require large bandwidth. Accordingly, interface device 110 may advantageously be scaled to bandwidth requirements of client 114. For example, in applications where client 114 has a large bandwidth requirement, interface device 110 may be configured to convert all N external RF signals received from second communication medium 108 to internal RF signals within interface device 110. As another example, in applications where client 114 has a small bandwidth requirement, interface device 110 may be configured to convert only a subset of the N external RF signals received from second communication medium to internal RF signals within interface device 110. Additionally, the fact that interface device 106 broadcasts the external RF signals onto second communication medium 108 enables communication system 100 to be modified to include additional interface devices (not shown in FIG. 1) receiving the external RF signals from second communication medium 108, such as discussed below with respect to FIG. 6.

Figure 2:
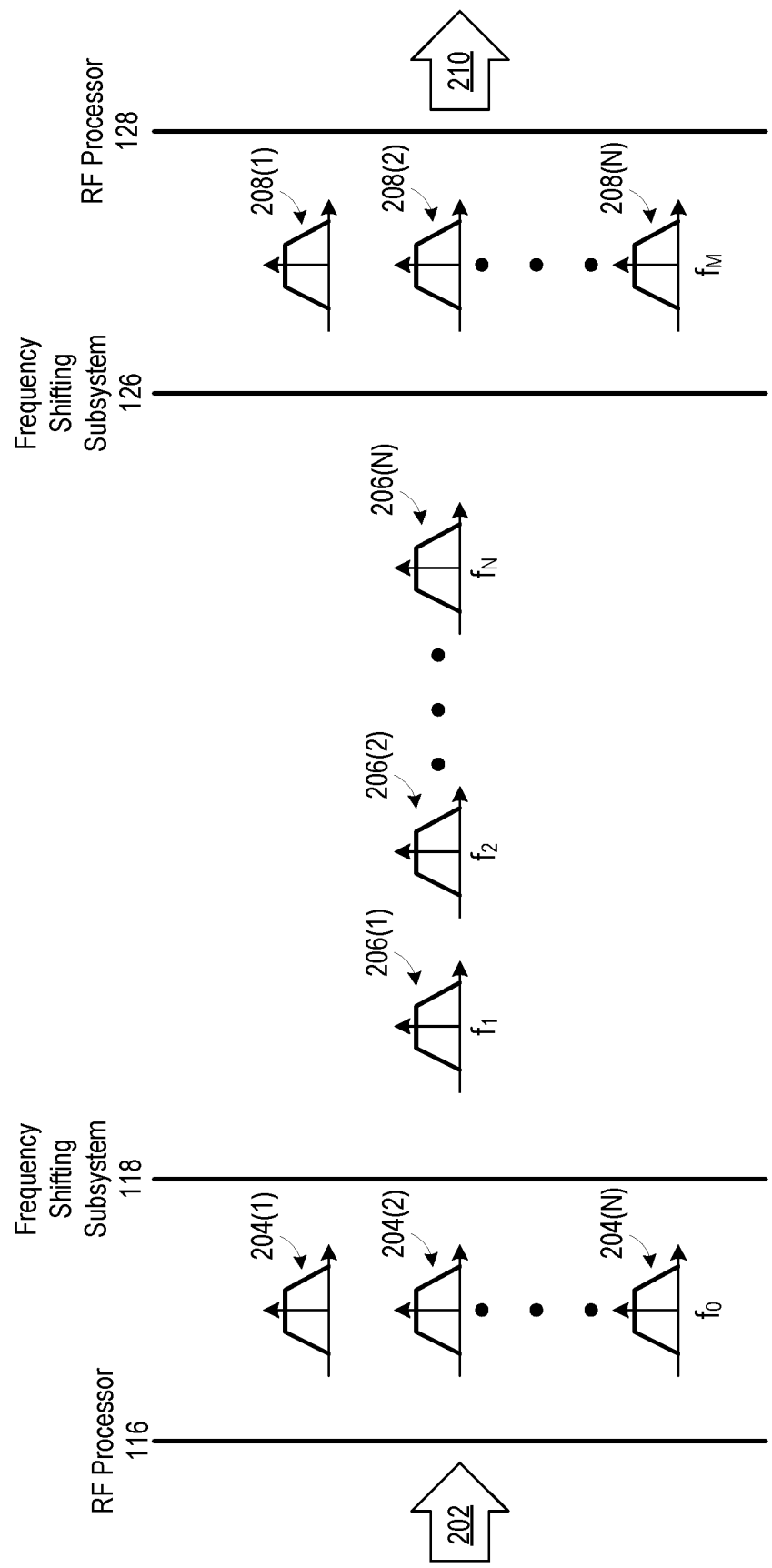
FIG. 2 is a signal flow diagram illustrating one example of operation of the FIG. 1 communication system during downlink data transmission.

FIG. 2 is a signal flow diagram illustrating one example of operation of the FIG. 1 communication system during downlink data transmission, i.e. when transmitting data from modem 102 to client 114. It is understood, though, that communication system 100 is not limited to the FIG. 2 operating example. Additionally, the FIG. 2 operating example could be applied to communication systems other than communication system 100 without departing from the scope hereof. FIG. 2 includes vertical lines logically representing RF processor 116, frequency shifting subsystem 118, frequency shifting subsystem 126, and RF processor 128.

In the FIG. 2 example, RF processor 116 receives a data signal 202 from modem 102, via first communication medium 104 and port 120. Data signal 202 includes downlink data intended for client 114. RF processor 116 converts data signal 202 into N internal RF signals 204 having a common center frequency $f_0$. In some embodiments, $f_0$ is approximately 5 GHz or 60 GHz. Additionally, in some embodiments N is equal to 8, and each internal RF signal 204 has a bandwidth of 80 megahertz (MHz) or 160 MHz. Frequency shifting subsystem 118 converts the N internal RF signals 204 having a common center frequency $f_0$ to N external RF signals 206 having different respective center frequencies $f_1, f_2, \ldots f_N$. In some embodiments, the N external RF signals 206 are non-overlapping in frequency as thus are stacked in the frequency domain. Additionally, in certain embodiments, each external RF signal 206 has a respective center frequency that is less than 1.5 GHz, to facilitate transmission of external RF signals 206 on coaxial electrical cable commonly found in buildings. In particular embodiments, the respective center frequency of each external RF signal 206 is less than the common center frequency $f_0$ of internal RF signals 204. In some embodiments, the respective center frequencies of external RF signals 206 are multiples of 160 MHz.

External RF signals 206 are transmitted from frequency shifting subsystem 118 of interface device 106 to frequency shifting subsystem 126 of interface device 110 at least partially via port 122, second communication medium 108, and port 130. Frequency shifting subsystem 126 converts external RF signals 206 having different respective center frequencies to internal RF signals 208 having a common center frequency $f_M$, in the FIG. 2 example. In some embodiments, internal RF signals 208 have the same common center frequency as internal RF signals 204, such that $f_M$ is equal to $f_0$, although internal RF signals 208 need not have the same center frequency as internal RF signals 204. RF processor 128 converts internal RF signals 208 to a data signal 210 for transmission to client 114 via port 132 and third communication medium 112.

Certain embodiments of communication system 100 are capable of transmitting upstream data from client 114 to modem 102. In these embodiments, RF processor 128 is further configured to receive a data signal from client 114 via third communication medium 112 and port 132, and RF processor 128 is configured to convert the received data signal into N internal RF signals having a common center frequency. Frequency shifting subsystem 126 is further configured to convert the N internal RF signals having a common center frequency to N external RF signals having different respective center frequencies, for transmission to frequency shifting subsystem 118 via port 130, second communication medium 108, and port 122. Frequency shifting subsystem 118 is configured to convert the received N external RF signals having different respective frequencies to N internal RF signals having a common center frequency. Finally, RF processor 116 is configured to convert the N internal RF signals from frequency shifting subsystem 118 to a data signal for transmission to modem 102 via port 120 and first communication medium 104.

Figure 3:
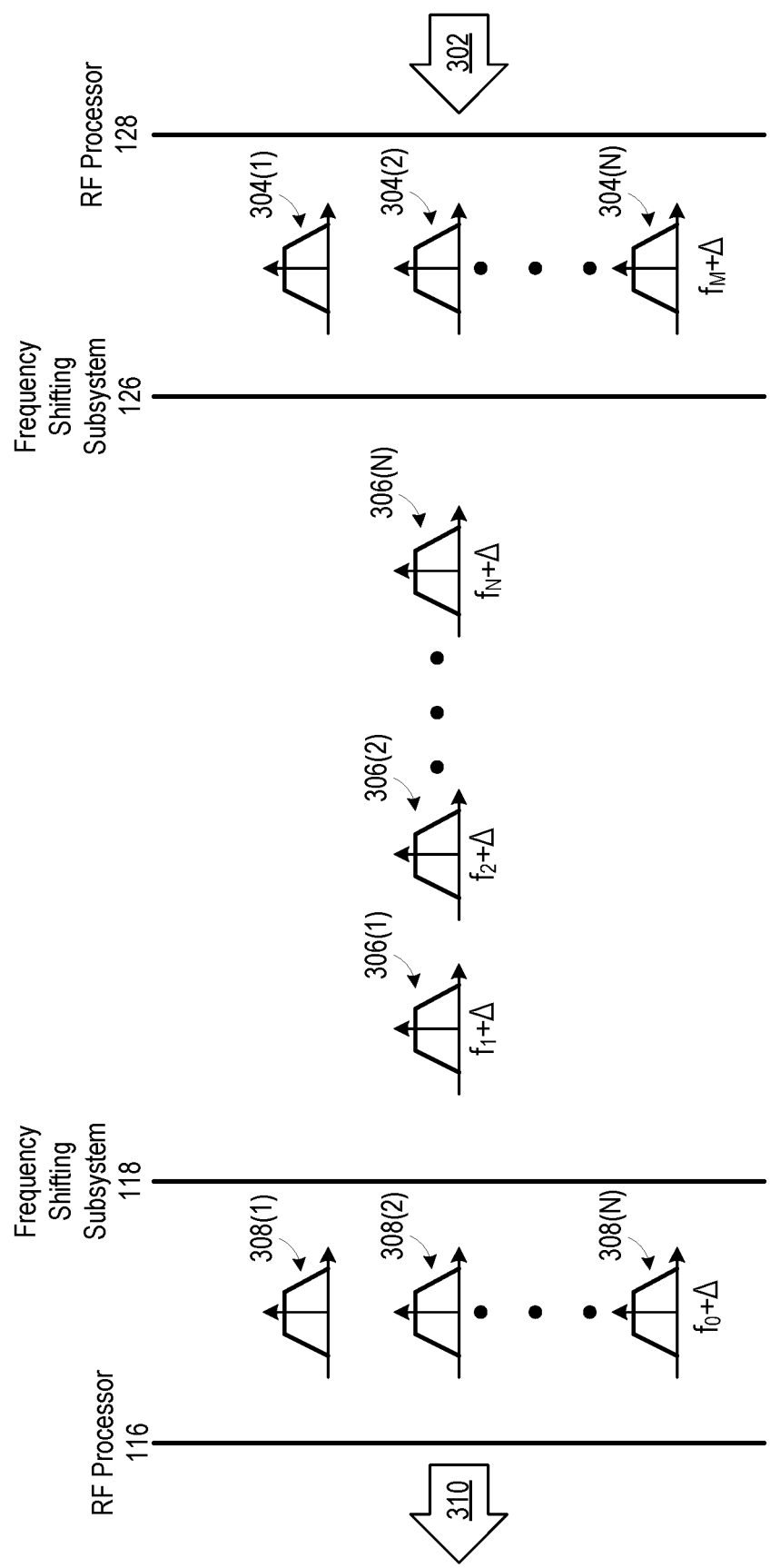
FIG. 3 is a signal flow diagram illustrating one example of operation of the FIG. 1 communication system during uplink data transmission.

FIG. 3 is a signal flow diagram illustrating one example of operation of the FIG. 1 communication system during uplink data transmission, i.e. when transmitting data from client 114 to modem 102. It is understood, though, that communication system 100 is not limited to the FIG. 3 operating example. Additionally, the FIG. 3 operating example could be applied to communication systems other than communication system 100 without departing from the scope hereof. FIG. 3 includes vertical lines logically representing RF processor 116, frequency shifting subsystem 118, frequency shifting subsystem 126, and RF processor 128.

In the FIG. 3 example, RF processor 128 receives a data signal 302 from client 114, via third communication medium 112 and port 132. Data signal 302 includes uplink data intended for modem 102. RF processor 128 converts data signal 302 into N internal RF signals 304 having a common center frequency $f_M+\Delta$. The frequencies of the FIG. 3 uplink example are offset from the frequencies of the FIG. 2 downlink example by a value $\Delta$, to allow for simultaneously uplink and downlink data transmission. However, uplink and downlink frequencies could be the same without departing from the scope hereof, such as if simultaneous uplink and downlink data transmission is not supported, or if another technique is used to prevent interference between uplink and downlink RF signals. Frequency shifting subsystem 126 converts the N internal RF signals 304 having a common center frequency $f_M+\Delta$ to N external RF signals 306 having different respective center frequencies $f_1+\Delta$, $f_2+\Delta$, . . . $f_N+\Delta$. In some embodiments, the N external RF signals 306 are non-overlapping in frequency as thus are stacked in the frequency domain. Additionally, in certain embodiments, each external RF signal 306 has a respective center frequency that is less than 1.5 GHz, to facilitate transmission of external RF signals 306 on coaxial electrical cable commonly found in buildings. Furthermore, in particular embodiments, the respective center frequency of each external RF signal 306 is less than the common center frequency $f_M+\Delta$ of internal RF signals 304.

External RF signals 306 are transmitted from frequency shifting subsystem 126 of interface device 110 to frequency shifting subsystem 118 of interface device 106 at least partially via port 130, second communication medium 108, and port 122. Frequency shifting subsystem 118 converts external RF signals 306 having different respective center frequencies to internal RF signals 308 having a common center frequency, in the FIG. 3 example. In some embodiments, internal RF signals 308 have the same common center frequency as internal RF signals 304, such that $f_M+\Delta$ is equal to $f_0+\Delta$, although internal RF signals 308 need not have the same center frequency as internal RF signals 304. RF processor 116 converts internal RF signals 308 to a data signal 310 for transmission to modem 102 via port 120 and first communication medium 104.

Figure 4:
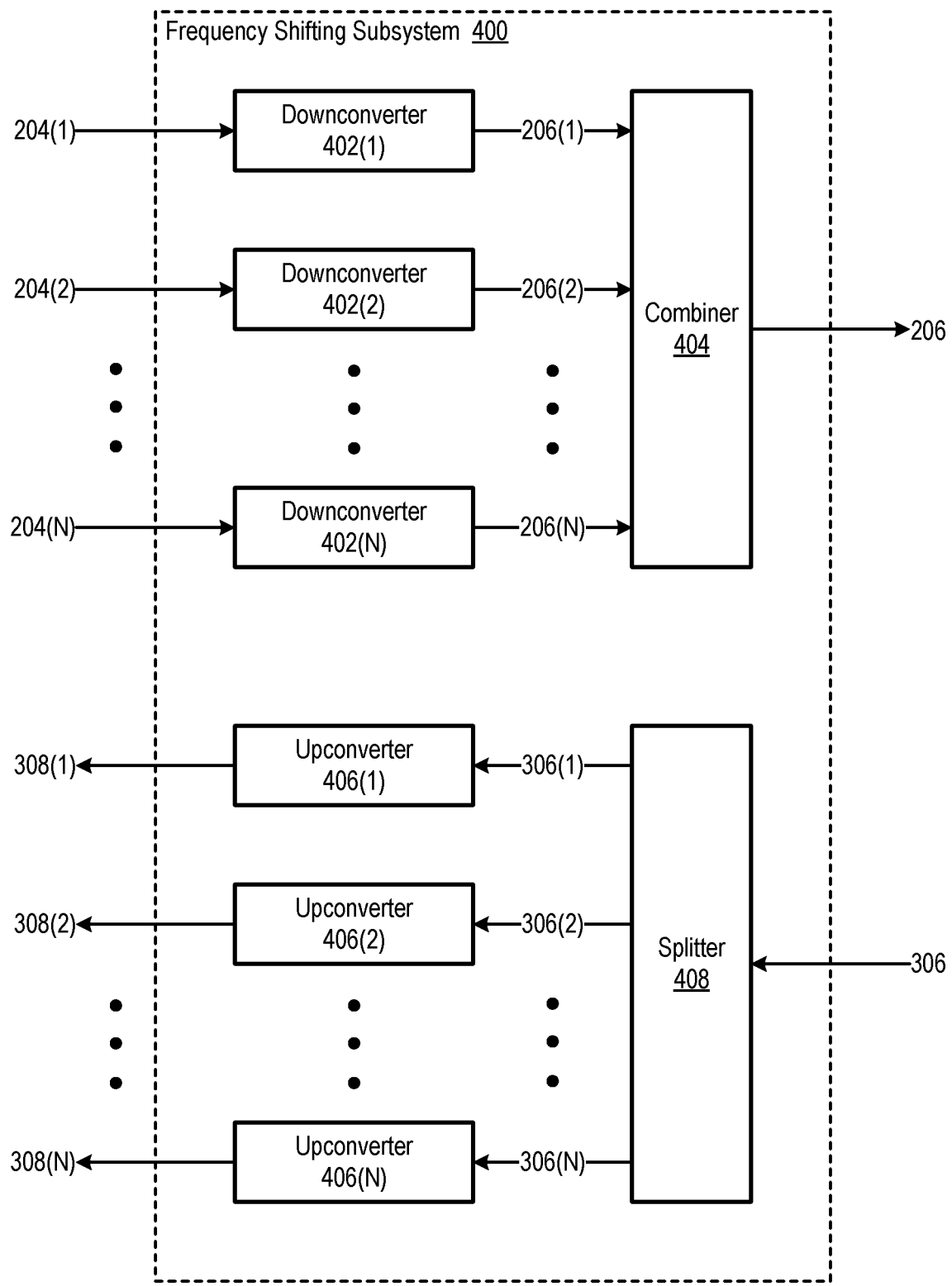
FIG. 4 is a block diagram of a frequency shifting subsystem, according to an embodiment.

FIG. 4 is a block diagram of a frequency shifting subsystem 400, which is one possible embodiment of frequency shifting subsystem 118 of FIG. 1. Although frequency shifting subsystem 400 is discussed with respect to the examples of FIGS. 2 and 3, frequency shifting subsystem 400 is not limited to use with these examples. Frequency shifting subsystem 400 includes N downconverters 402, a combiner 404, N upconverters 406, and a splitter 408. Each downconverter 402 is configured to receive a respective internal RF signal 204 and convert it to a respective external RF signal 206. In this embodiment, each external RF signal 206 has a lower respective center frequency than the common center frequency of internal RF signals 204. Combiner 404 is configured to combine all N external RF signals 206 onto a common electrical conductor, for transmission by second communication medium 108. Splitter 408 is configured receive N external RF signals 306 from second communication medium 108 and route each external RF signal 306 to a respective upconverter 406. Each upconverter 406 is configured to convert its respective external RF signal 306 to a respective internal RF signal 308. Internal RF signals 308 have a common center frequency that is higher than the respective center frequencies of external RF signals 306, in this embodiment.

Figure 5:
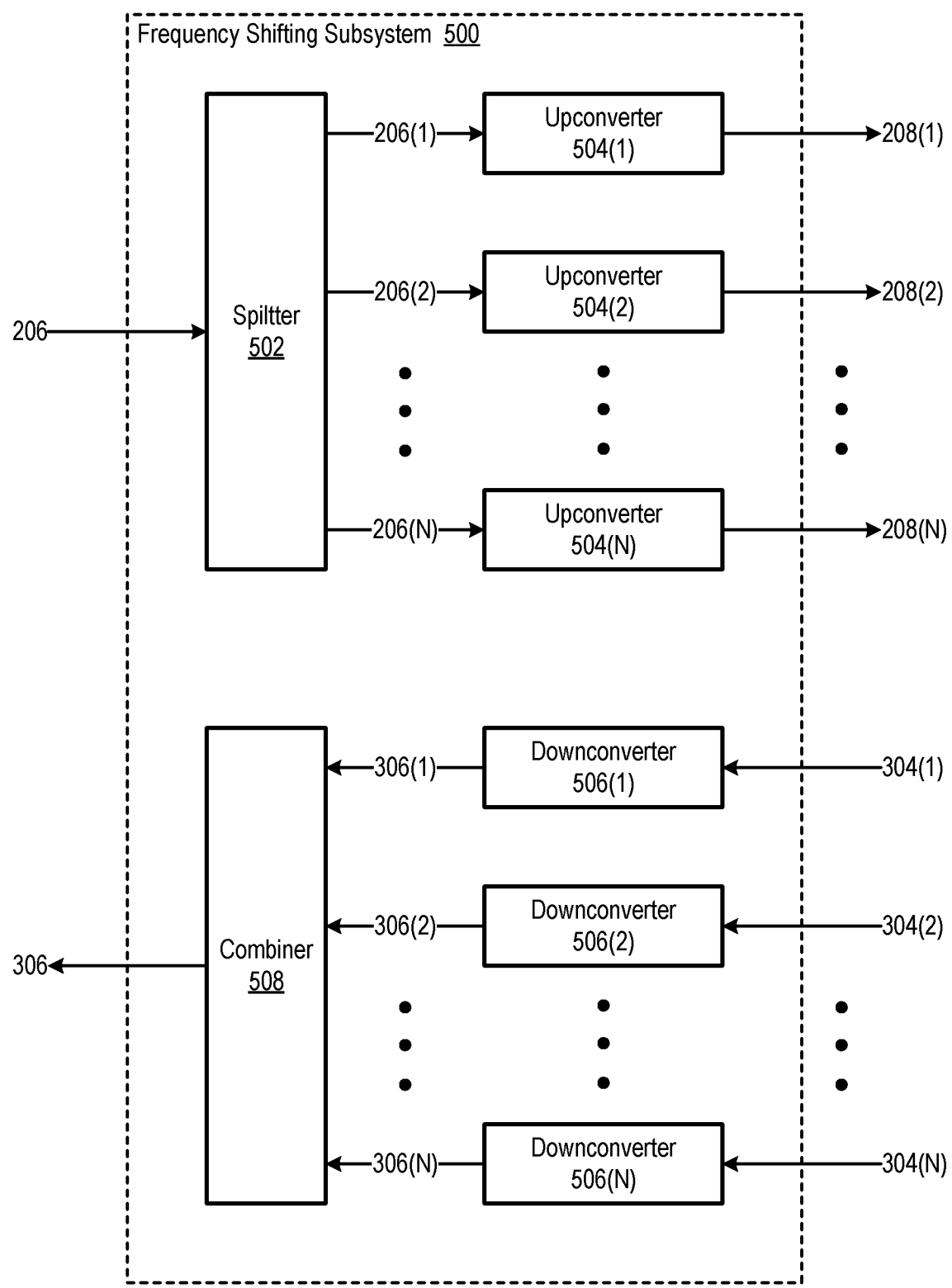
FIG. 5 is a block diagram of another frequency shifting subsystem, according to an embodiment.

FIG. 5 is a block diagram of a frequency shifting subsystem 500, which is one possible embodiment of frequency shifting subsystem 126 of FIG. 1. Although frequency shifting subsystem 500 is discussed with respect to the examples of FIGS. 2 and 3, frequency shifting subsystem 500 is not limited to use with these examples. Frequency shifting subsystem 500 includes a splitter 502, N upconverters 504, N downconverters 506, and a combiner 508. Splitter 502 is configured receive N external RF signals 206 from second communication interface 108 and route each external RF signal 206 to a respective upconverter 504. Each upconverter 504 is configured to convert its respective external RF signal 206 to a respective internal RF signal 208. In this embodiment, internal RF signals 208 have a common center frequency that is higher than the respective center frequencies of external RF signals 206. Each downconverter 506 is configured to receive a respective internal RF signal 304 and convert it to a respective external RF signal 306. In this embodiment, each external RF signal 306 has a lower respective center frequency than the common center frequency of internal RF signals 304. Combiner 508 is configured to combine all N external RF signals 306 onto a common electrical conductor for transmission by second communication medium 108.

Figure 6:
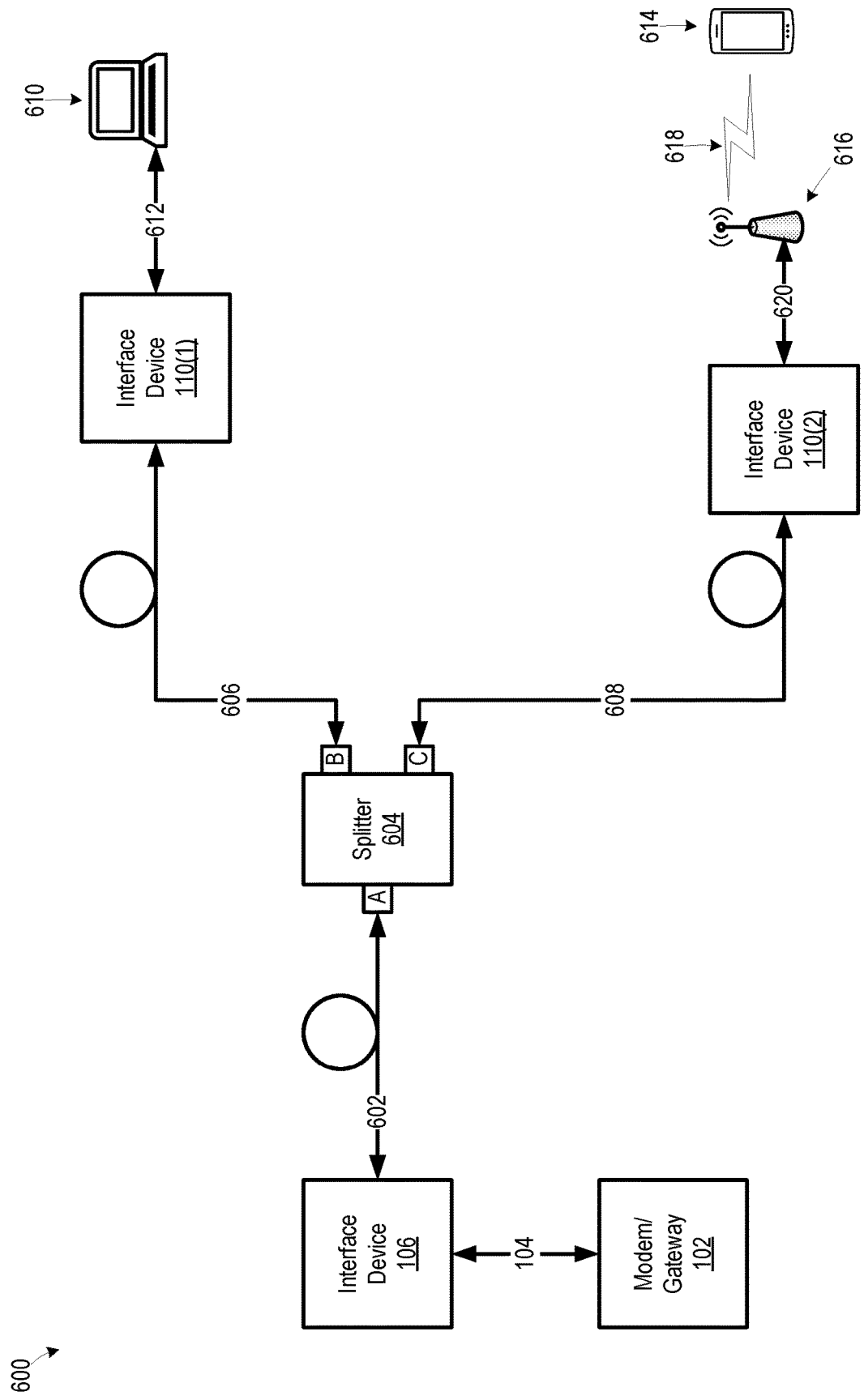
FIG. 6 is a schematic diagram of an alternate embodiment of the FIG. 1 communication system including an additional interface device.

FIG. 6 is a schematic diagram of a communication system 600, which is an alternate embodiment of communication system 100 (FIG. 1) including two client interface devices, i.e. interface devices 110(1) and 110(2). Elements that are common to communication systems 100 and 600 are labeled with like reference numbers. However, details of interface devices 106, 110(1), and 110(2) are not shown for illustrative clarity. Second communication medium 108 of communication system 100 is embodied by a main segment 602 of coaxial electrical cable, a splitter 604, a coaxial electrical cable branch 606, and a coaxial electrical cable branch 608. Splitter 604 includes ports A, B, and C, and splitter 604 communicatively couples each of coaxial electrical cable branches 606 and 608 to main segment 602 of coaxial electrical cable via ports B, C, and A, respectively. Splitter 604 is configured to route external RF signals from interface device 106 to each of coaxial electrical cable branches 606 and 608. Accordingly, interface device 106 broadcasts external RF signals to each of interface devices 110(1) and 110(2), i.e. each of interface devices 110(1) and 110(2) receives all external RF signals from interface device 106, although each interface device 110 need not necessarily process all of the external RF signals. Additionally, splitter 604 routes external RF signals from each coaxial electrical cable branch 606 and 608 onto main segment 602 of coaxial electrical cable, for uplink data transmission from a client to modem 102. Furthermore, in some embodiments, interface devices 110(1) and 110(2) are capable of directly communicating with each other via coaxial electrical cable branches 606 and 608 and splitter 604.

Figure 7:
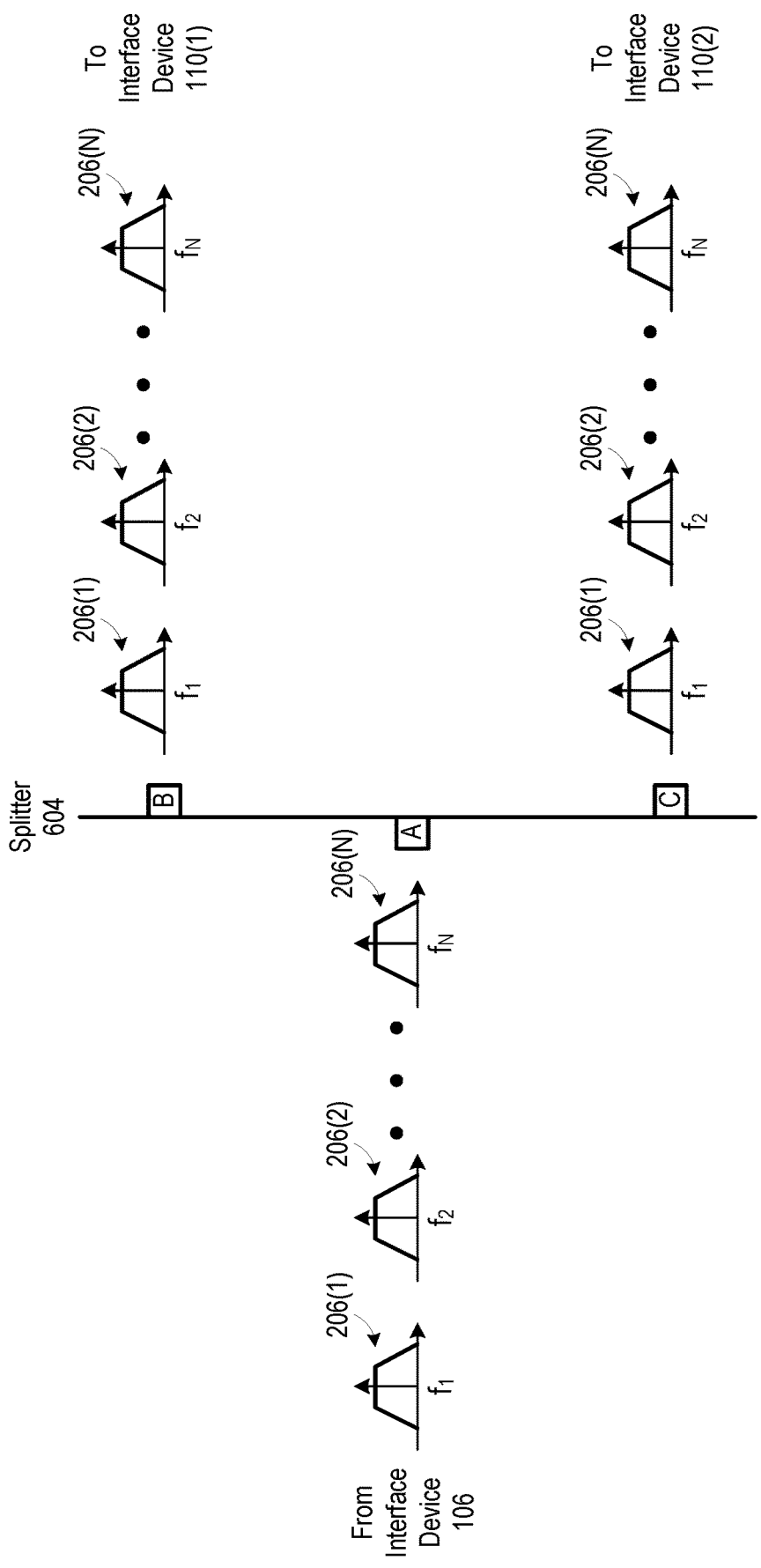
FIG. 7 is a dataflow diagram illustrating one example of operation of a splitter of the FIG. 6 communication system.

FIG. 7 is a dataflow diagram illustrating one example of operation of splitter 604 during downlink data transmission. Although splitter 604 is discussed in FIG. 7 with respect to the example of FIG. 2, splitter 604 is not limited to this example. In the FIG. 7 example, splitter receives external RF signals 206 at port A from interface device 106 via main segment 602 of coaxial electrical cable. Splitter routes external RF signals 206 to each of ports B and C for transmission to interface devices 110(1) and 110(2), respectively. Thus, each of interface devices 110(1) and 110(2) receives external RF signals 206, although some embodiments of splitter 604 may attenuate external RF signals 206 while routing the external RF signals from port A to each of ports B and C.

Referring again to FIG. 6, a computer 610 is communicatively coupled to interface device 110(1) via an Ethernet electrical cable 612. Accordingly, computer 610 and Ethernet electrical cable 612 are embodiments of client 114 and third communication medium 112, respectively. Additionally, a mobile phone 614 is communicatively coupled to a wireless access point 616 via RF signals 618, and wireless access point 616 is communicatively coupled to interface device 110(2) via an Ethernet electrical cable 620. Accordingly, mobile phone 614 is another embodiment of client 114, and wireless access point 616 and Ethernet electrical cable 620 are collectively another embodiment of third communication medium 112. In some embodiments, wireless access point 616 is an LTE wireless access point, a 5G wireless access point, a 6G wireless access point, an unlicensed RF wireless point (e.g. a Wi-Fi or unlicensed 5G new radio (NR)), or extensions and/or variations thereof. Wireless access point 616 could serve additional clients without departing from the scope hereof. Additionally, communication system 600 could be modified to include additional client interface devices, such as by replacing splitter 604 with a splitter including additional ports, or by adding one or more additional splitters.

The interface devices and associated methods disclosed herein may achieve significant advantages. For example, interface devices 106 and 110 enable high-bandwidth data to be transmitted from a modem to one or more clients via coaxial electrical cable, such as illustrated in FIGS. 1 and 6. As discussed above, coaxial electrical cable is commonly present in buildings, and interface devices 106 and 110 may therefore enable wireline transmission of high-bandwidth data without requiring new cable installation. Additionally, RF signals traveling through coaxial electrical cable are not affected by obstacles in buildings, such as walls, ceilings, floors, and furniture. Therefore, interface devices 106 and 110 may enable high-bandwidth data to be transmitted to client devices that are distant from a host modem or gateway. Furthermore, coaxial electrical cable is typically highly immune to interfering RF signals, and communication systems including interface devices 106 and 110 are therefore generally insensitive to interference from wireless signals.

Moreover, communication systems using the new interfaces devices support point-to-multipoint communication. Therefore, the communication systems are scalable in that they can serve additional clients merely by connecting another interface device to a coaxial electrical cable joining the interface devices. For example, in the FIG. 6 communication system, two clients (computer 610 and mobile phone 614) are served simply by coupling interface devices 110(1) and 110(2) to coaxial electrical cable branches 606 and 608, respectively. Additionally, some embodiments of interface devices 106 and 110 are formed of low-cost components, e.g. commodity RF processors, downconverters, and upconverters, which promotes low cost of the interface devices. Such low cost of interface devices 106 and 110 is particularly advantageous in communication systems including multiple interface devices, such as to serve clients in several rooms in a building.

Figure 8:
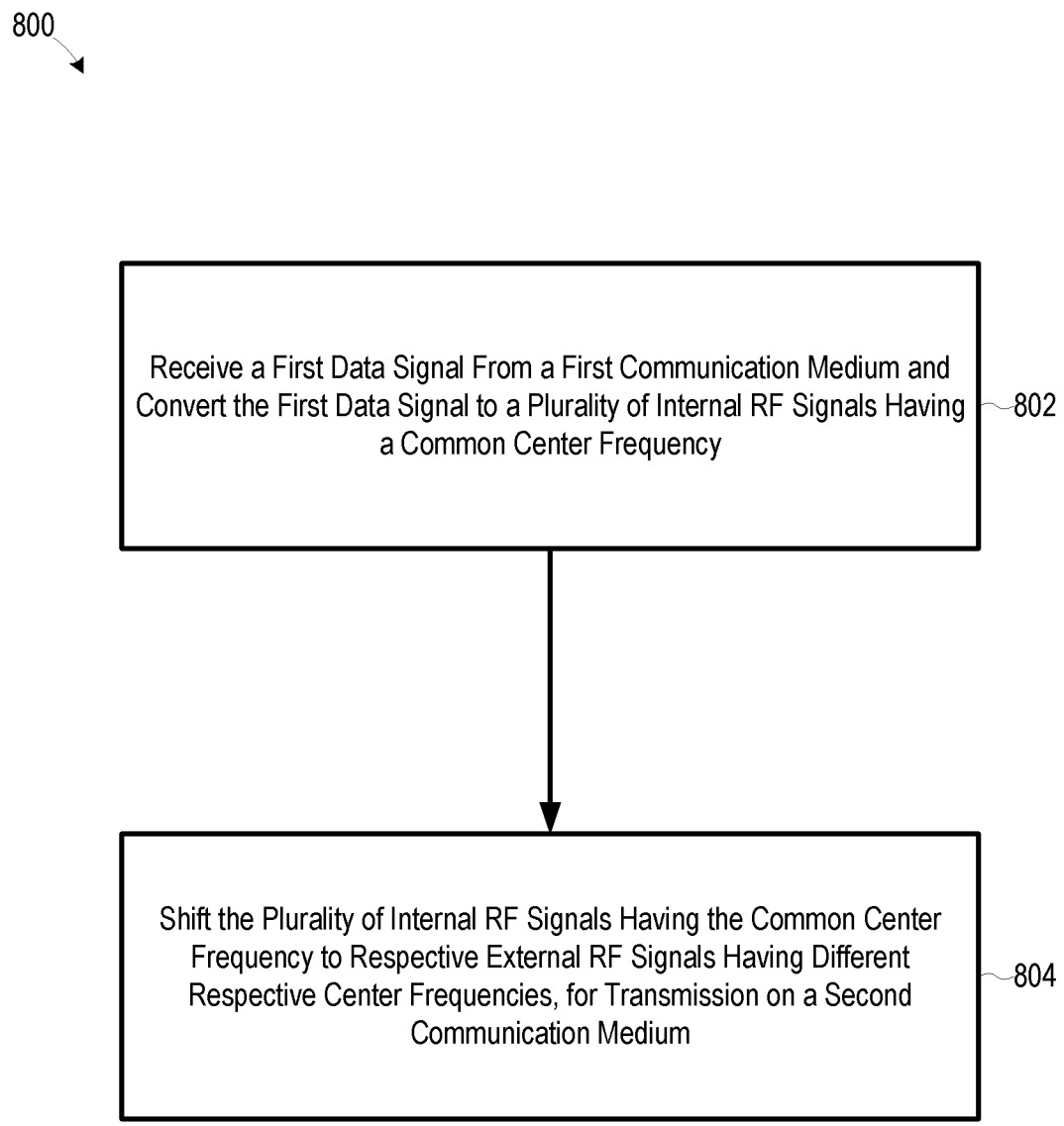
FIG. 8 is a flow chart of a method for communicatively coupling a first communication medium and a second communication medium, according to an embodiment.

FIG. 8 is a flow chart illustrating a method 800 for communicatively coupling a first communication medium and a second communication medium. In a block 802, a first data signal is received from a first communication medium, and the first data signal is converted to a plurality of internal RF signals having a common center frequency. In one example of block 802, RF processor 116 receives data signal 202 from modem 102 via first communication medium 104 and port 120, and RF processor 116 convert data signal 202 to N internal RF signals 204 having a center frequency $f_0$. In a block 804, the internal RF signals having the common center frequency are shifted to respective external RF signals having different respective center frequencies, for transmission on the second communication medium. In one example of block 804, frequency shifting subsystem 118 shifts N internal RF signals 204 having a common center frequency $f_0$ to N external RF signals 206 having different respective center frequencies $f_1, f_2, \ldots f_N$, for transmission on second communication medium 108.

Combinations of Features

Features described above may be combined in various ways without departing from the scope hereof. The following examples illustrate some possible combinations.

(A1) An interface device for communicatively coupling a first communication medium and a second communication medium may include (1) a radio frequency (RF) processor configured to receive a first data signal from the first communication medium and convert the first data signal to a plurality of first internal RF signals having a common center frequency, and (2) a frequency shifting subsystem configured shift the plurality of first internal RF signals having the common center frequency to respective first external RF signals having different respective center frequencies, for transmission on the second communication medium.

(A2) In the interface device denoted as (A1), the second communication medium may be a coaxial electrical cable, and the interface device may further include a coaxial electrical cable port configured to communicatively couple the first external RF signals from the frequency shifting subsystem to the coaxial electrical cable.

(A3) In any one of the interface devices denoted as (A1) and (A2), the first communication medium may be one of an Ethernet electrical cable and an optical cable, and the interface device may further include one of (a) an Ethernet electrical cable port configured to communicatively couple the first data signal from the Ethernet electrical cable to the RF processor and (b) an optical cable port configured to communicatively couple the first data signal from the optical cable to the RF processor.

(A4) In any one of interface devices denoted as (A1) through (A3), the RF processor may be further configured to convert the first data signal to the plurality of first internal RF signals such that the plurality of first internal RF signals at least partially comply with an Institute of Electrical and Electronics Engineers (IEEE) 802.11-based standard.

(A5) In the interface device denoted as (A4), the IEEE 802.11-based standard may be an IEEE 802.11ax-based standard.

(A6) In any one of the interface devices denoted as (A1) through (A5), the frequency shifting subsystem may be further configured shift the plurality of first internal RF signals having the common center frequency to the respective first external RF signals having different respective center frequencies that are less than 1.5 gigahertz.

(A7) In any one of the interface devices denoted as (A1) through (A6), (1) the frequency shifting subsystem may be further configured shift a plurality of second external RF signals received from the second communication medium and having different respective center frequencies to a plurality of second internal RF signals having a common center frequency, and (2) the RF processor may be further configured to convert the plurality of second internal RF signals to a second data signal for transmission on the first communication medium.

(B1) A method for communicatively coupling a first communication medium and a second communication medium may include (1) receiving a first data signal from the first communication medium and converting the first data signal to a plurality of first internal radio frequency (RF) signals having a common center frequency, and (2) shifting the plurality of first internal RF signals having the common center frequency to respective first external RF signals having different respective center frequencies, for transmission on the second communication medium.

(B2) In the method denoted as (B1), the second communication medium may be a coaxial electrical cable, and the method may further include broadcasting the first external RF signals on the coaxial electrical cable.

(B3) In any one of the methods denoted as (B1) and (B2), the first communication medium may be one of an Ethernet electrical cable and an optical cable.

(B4) In any one of the methods denoted as (B1) through (B3), converting the first data signal to the plurality of first internal RF signals having the common center frequency may include converting the first data signal to the plurality of first internal RF signals such that the plurality of first internal RF signals at least partially comply with an Institute of Electrical and Electronics Engineers (IEEE) 802.11-based standard.

(B5) In the method denoted as (B4), the IEEE 802.11-based standard may be an IEEE 802.11ax-based standard.

(B6) Any one of the methods denoted as (B1) through (B5) may further include (1) shifting a plurality of second external RF signals received from the second communication medium and having different respective center frequencies to a plurality of second internal RF signals having a common center frequency, and (2) converting the plurality of second internal RF signals to a second data signal for transmission on the first communication medium.

(B7) Any one of the methods denoted as (B1) through (B5) may further include transmitting the first external RF signals to a client interface device via the second communication medium.

(B8) The method denoted as (B7) may further include, at the client interface device, (1) shifting the first external RF signals to a plurality of second internal RF signals having a common center frequency, and (2) converting the second internal RF signals to a second data signal for transmission on a third communication medium.

(B9) In the method denoted as (B8), the third communication medium may include one of an Ethernet electrical cable, a wireless communication medium, and an optical communication medium.

(B10) Any one of the methods denoted as (B1) through (B5) may further include routing the first external RF signals from a main segment of the second communication medium to each of (a) a first branch of the second communication medium and (b) a second branch of the second communication medium.

(B11) In the method denoted as (B10), (1) the second communication medium may include a coaxial electrical cable, and (2) routing first external RF signals from the main segment of the second communication medium to each of the first and second branches of the second communication medium may be performed using a splitter communicatively coupling each of the first and second branches of the second communication medium to the main segment of the second communication medium.

(B12) In any one of the methods denoted as (B10) and (B11), the method may further include, at a first client node communicatively coupled to the first branch of the second communication medium, (1) shifting a first subset of the first external RF signals to a plurality of second internal RF signals having a common center frequency, and (2) converting the second internal RF signals to a second data signal for transmission on a third communication medium.

(B13) The method denoted as (B13) may further include, at a second client node communicatively coupled to the second branch of the second communication medium, (1) shifting a second subset of the first external RF signals to a plurality of third internal RF signals having a common center frequency, and (2) converting the third internal RF signals to a third data signal for transmission on a fourth communication medium.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present methods, devices, and systems, which as a matter of language, might be said to fall therebetween.

What is claimed is:

1. An interface device for communicatively coupling a first communication medium and a second communication medium, comprising:
    a radio frequency (RF) processor configured to receive a first data signal from the first communication medium and convert the first data signal to a plurality of first internal RF signals having a common center frequency; and
    a frequency shifting subsystem configured to shift each first internal RF signal to a respective first external RF signal, each first external RF signal having a different respective center frequency, for transmission on the second communication medium.

2. The interface device of claim 1, wherein the second communication medium is a coaxial electrical cable, and the interface device further comprises a coaxial electrical cable port configured to communicatively couple the first external RF signals from the frequency shifting subsystem to the coaxial electrical cable.

3. The interface device of claim 1, wherein the first communication medium is one of an Ethernet electrical cable and an optical cable, and the interface device further comprises one of (a) an Ethernet electrical cable port configured to communicatively couple the first data signal from the Ethernet electrical cable to the RF processor and (b) an optical cable port configured to communicatively couple the first data signal from the optical cable to the RF processor.

4. The interface device of claim 1, wherein the RF processor is further configured to convert the first data signal to the plurality of first internal RF signals such that the plurality of first internal RF signals at least partially comply with an Institute of Electrical and Electronics Engineers (IEEE) 802.11-based standard.

5. The interface device of claim 4, wherein the IEEE 802.11-based standard is an IEEE 802.11ax-based standard.

6. The interface device of claim 1, wherein the frequency shifting subsystem is further configured to shift each first internal RF signal to its respective first external RF signal such that each first external RF signal has a respective center frequency that is less than 1.5 gigahertz.

7. The interface device of claim 1, wherein:
the frequency shifting subsystem is further configured shift a plurality of second external RF signals received from the second communication medium and having different respective center frequencies to a plurality of second internal RF signals having a common center frequency; and
the RF processor is further configured to convert the plurality of second internal RF signals to a second data signal for transmission on the first communication medium.

8. A method for communicatively coupling a first communication medium and a second communication medium, comprising:
receiving a first data signal from the first communication medium and converting the first data signal to a plurality of first internal radio frequency (RF) signals having a common center frequency; and
shifting each first internal RF signal to a respective first external RF signal, each first external RF signal having a different respective center frequency, for transmission on the second communication medium.

9. The method of claim 8, wherein the second communication medium is a coaxial electrical cable, and the method further comprises broadcasting the first external RF signals on the coaxial electrical cable.

10. The method of claim 8, wherein the first communication medium is one of an Ethernet electrical cable and an optical cable.

11. The method of claim 8, wherein converting the first data signal to the plurality of first internal RF signals having the common center frequency comprises converting the first data signal to the plurality of first internal RF signals such that the plurality of first internal RF signals at least partially comply with an Institute of Electrical and Electronics Engineers (IEEE) 802.11-based standard.

12. The method of claim 11, where the IEEE 802.11-based standard is an IEEE 802.11ax-based standard.

13. The method of claim 8, further comprising:
shifting a plurality of second external RF signals received from the second communication medium and having different respective center frequencies to a plurality of second internal RF signals having a common center frequency; and
converting the plurality of second internal RF signals to a second data signal for transmission on the first communication medium.

14. The method of claim 8, further comprising transmitting the first external RF signals to a client interface device via the second communication medium.

15. The method of claim 14, further comprising, at the client interface device:
shifting the first external RF signals to a plurality of second internal RF signals having a common center frequency; and
converting the second internal RF signals to a second data signal for transmission on a third communication medium.

16. The method of claim 15, wherein the third communication medium comprises one of an Ethernet electrical cable, a wireless communication medium, and an optical communication medium.

17. The method of claim 8, further comprising routing the first external RF signals from a main segment of the second communication medium to each of (a) a first branch of the second communication medium and (b) a second branch of the second communication medium.

18. The method of claim 17, wherein:
the second communication medium comprises a coaxial electrical cable; and
routing first external RF signals from the main segment of the second communication medium to each of the first and second branches of the second communication medium is performed using a splitter communicatively coupling each of the first and second branches of the second communication medium to the main segment of the second communication medium.

19. The method of claim 17, further comprising, at a first client node communicatively coupled to the first branch of the second communication medium:
shifting a first subset of the first external RF signals to a plurality of second internal RF signals having a common center frequency; and
converting the second internal RF signals to a second data signal for transmission on a third communication medium.

20. The method of claim 19, further comprising, at a second client node communicatively coupled to the second branch of the second communication medium:
shifting a second subset of the first external RF signals to a plurality of third internal RF signals having a common center frequency; and
converting the third internal RF signals to a third data signal for transmission on a fourth communication medium.

21. The method of claim 8, wherein the respective center frequency of each first external RF signal is lower than the common center frequency of the plurality of first internal RF signals.

22. The method of claim 8, wherein the second communication medium comprises one or more coaxial electrical cables, and the method further comprises broadcasting each first external RF signal to one or more client interfaces devices via the one or more coaxial electrical cables.

* * * * *